(12) United States Patent
Castellanos Zamora et al.

(10) Patent No.: US 8,640,186 B2
(45) Date of Patent: Jan. 28, 2014

(54) PRE-AUTHORIZATION OF BEARER SET-UP

(75) Inventors: David Castellanos Zamora, Madrid (ES); Susana Fernandez Alonso, Madrid (ES); Maria Belen Pancorbo Marcos, Madrid (ES); Jose Javier Pastor Balbás, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 385 days.

(21) Appl. No.: 12/743,642

(22) PCT Filed: Nov. 19, 2007

(86) PCT No.: PCT/EP2007/062521
§ 371 (c)(1),
(2), (4) Date: Jun. 1, 2010

(87) PCT Pub. No.: WO2009/065434
PCT Pub. Date: May 28, 2009

(65) Prior Publication Data
US 2010/0257582 A1     Oct. 7, 2010

(51) Int. Cl.
*H04L 29/00* (2006.01)
(52) U.S. Cl.
USPC .................................... 726/1; 726/2; 726/27

(58) Field of Classification Search
USPC ........................................................... 726/27
See application file for complete search history.

(56) References Cited

U.S. PATENT DOCUMENTS

| | | | |
|---|---|---|---|
| 2002/0036983 A1* | 3/2002 | Widegren et al. | 370/230.1 |
| 2008/0229385 A1* | 9/2008 | Feder et al. | 726/1 |
| 2008/0310303 A1* | 12/2008 | Wang et al. | 370/230.1 |

* cited by examiner

*Primary Examiner* — Ghazal Shehni

(57) ABSTRACT

A request is received to install control rules before having received a corresponding QoS Authorization, especially where the QoS Authorization requires a prior reservation of resources. The request for a bearer resource is pre-authorized before having received a QoS authorization for said request, by receiving a request for a bearer resource; determining that a QoS authorization has, not been received yet; pre-authorizing said request for the bearer resource by installing initial control rules; and updating the previously installed initial control rules with final control rules upon receipt of the QoS authorization. This pre-authorization and the submission of initial control rules are carried out from a PCRF server towards a PCEF device, before having received the QoS authorization. In particular, the pre-authorization may be triggered from a P-CSCF at the originating or destination side, or at both.

32 Claims, 10 Drawing Sheets

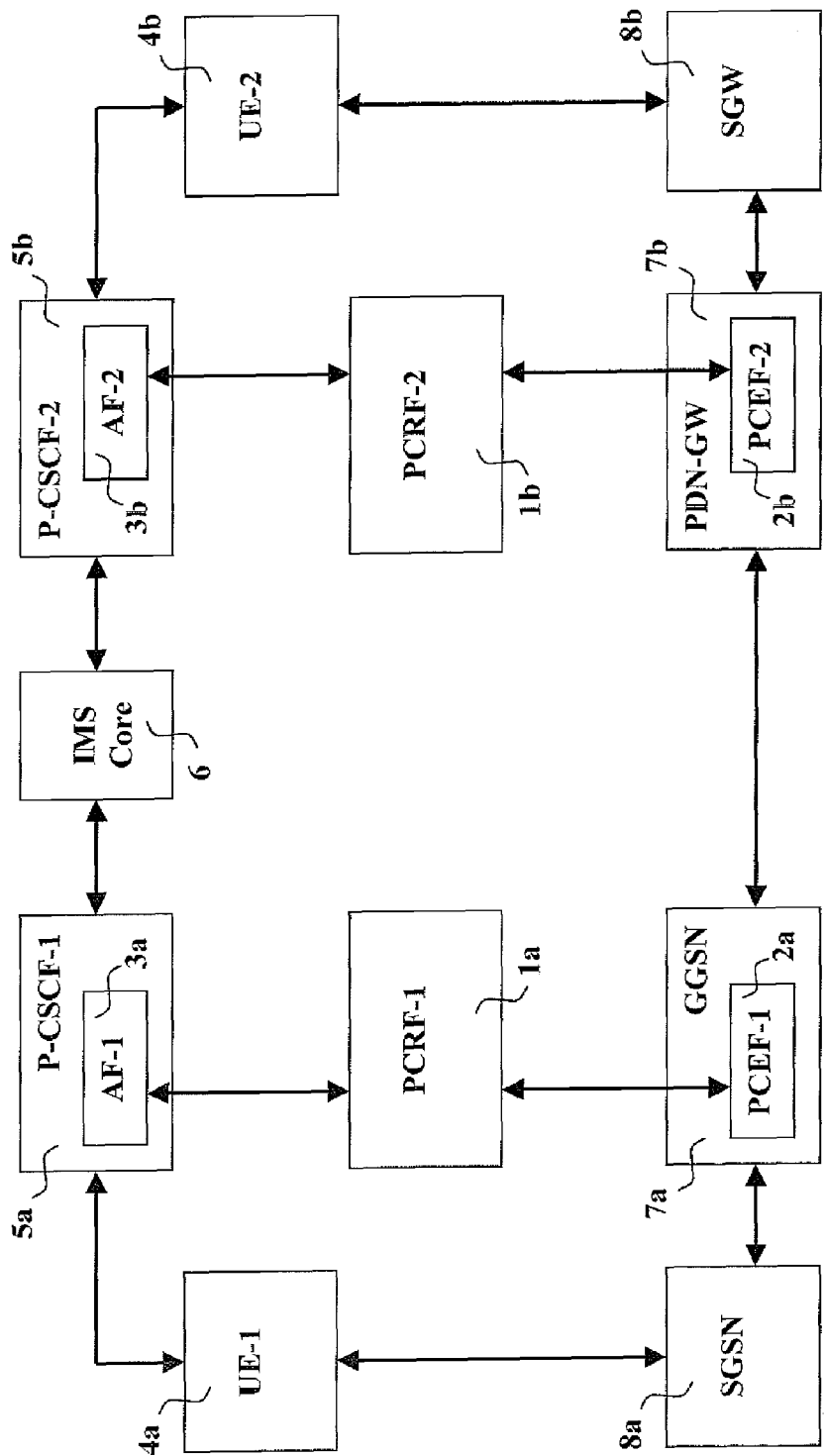
FIG.-1-

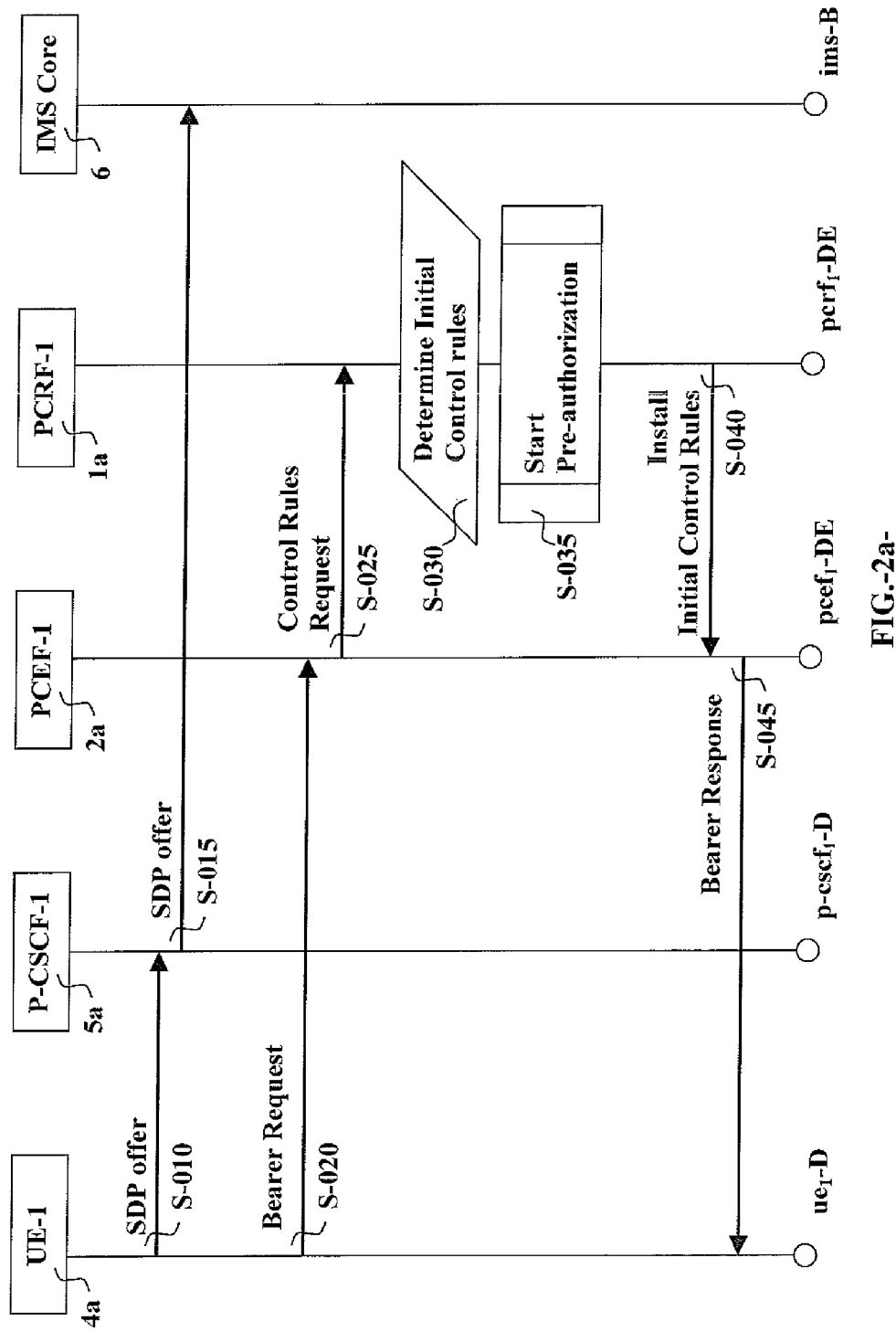
FIG.-2a-

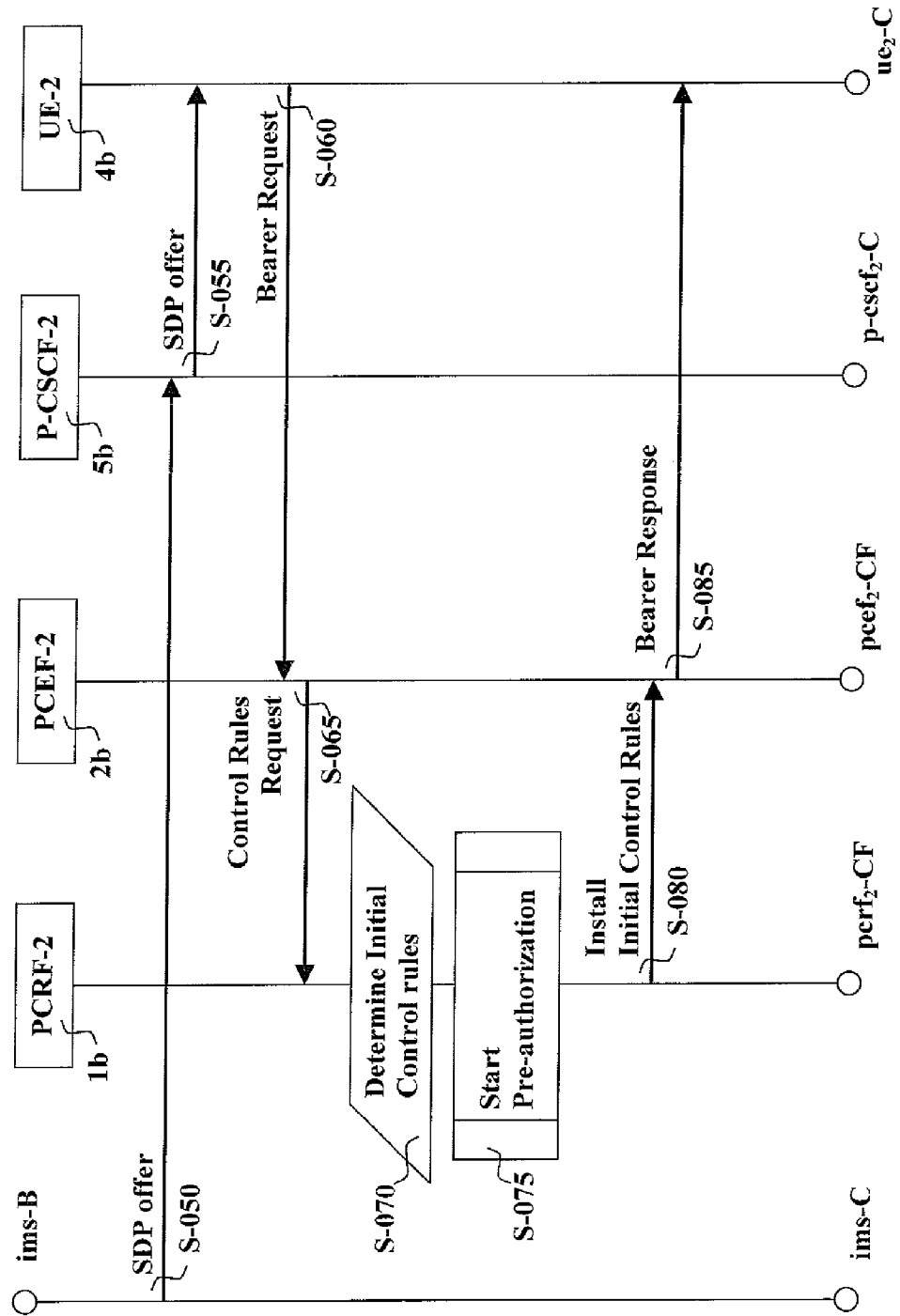
FIG.-2b-

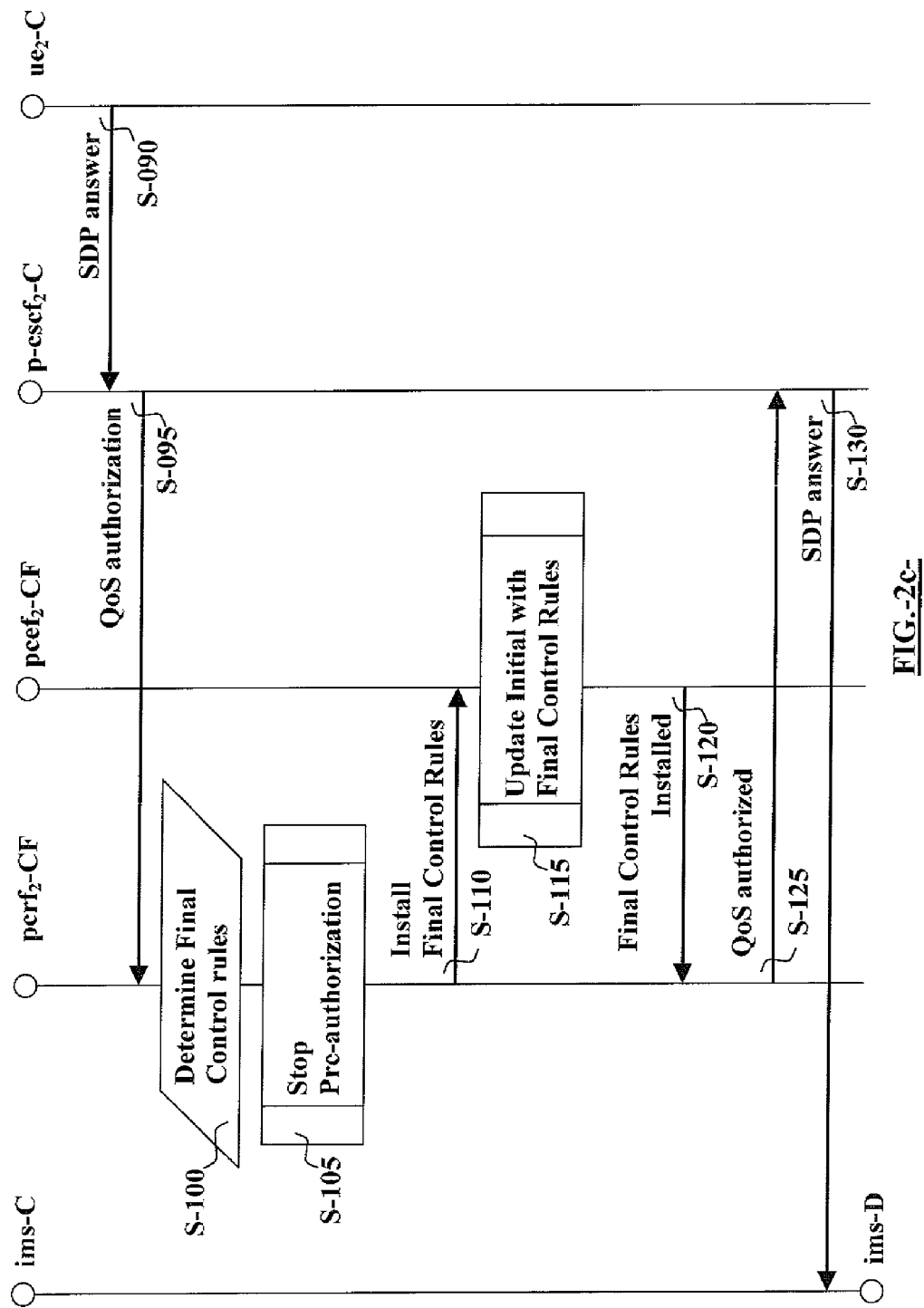
FIG.-2c-

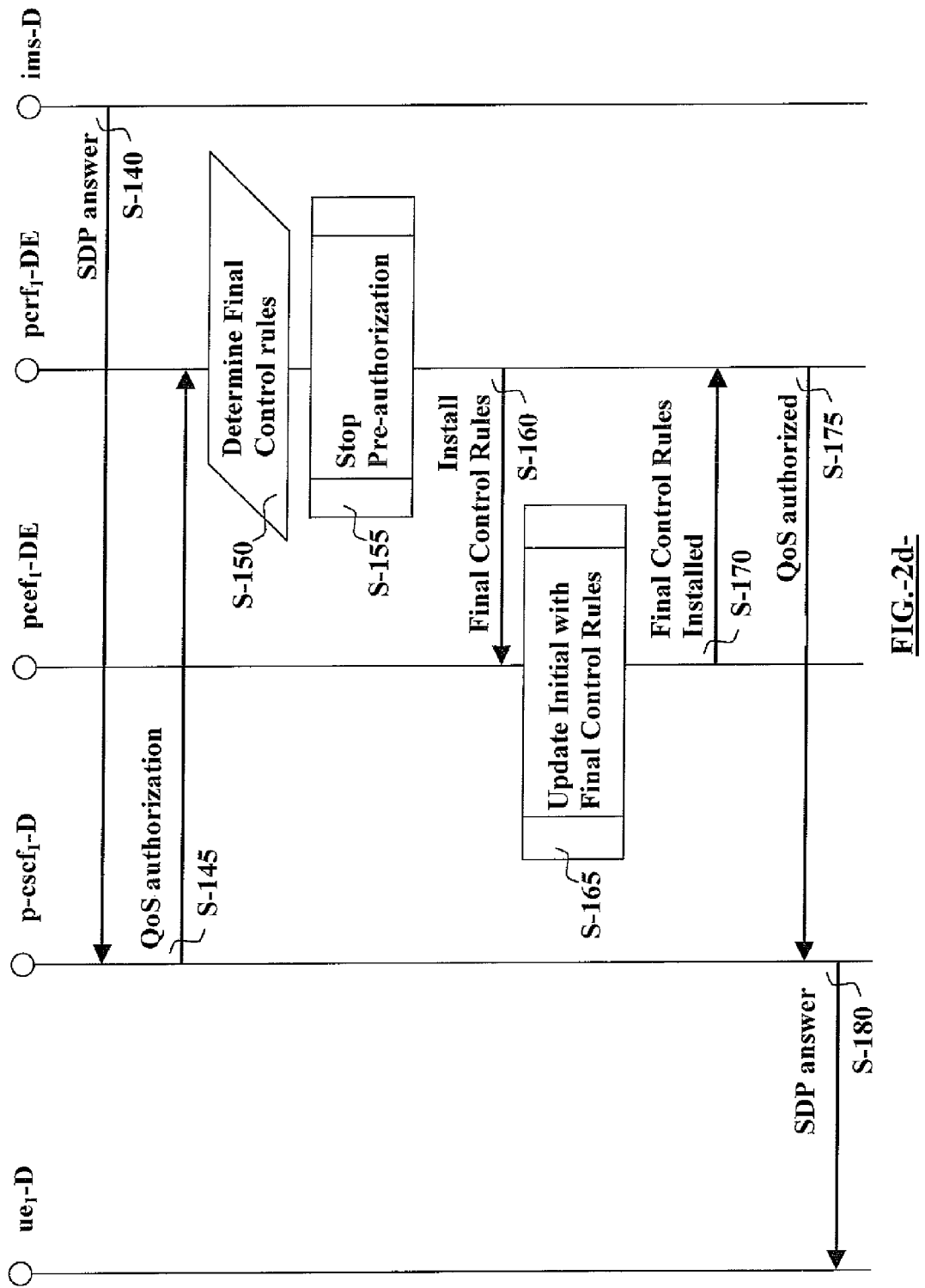
FIG.-2d-

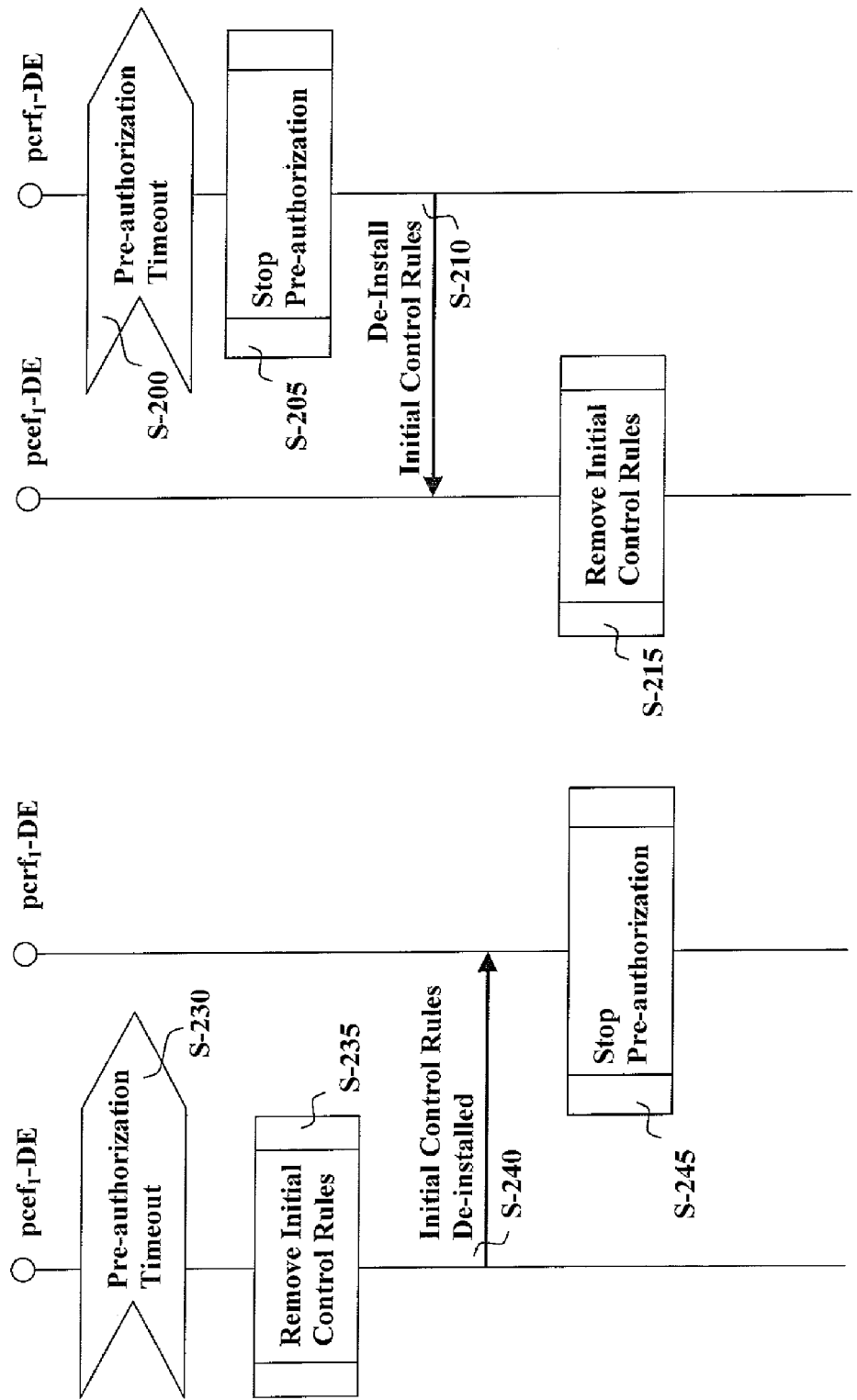
FIG. -2e1-
FIG. -2e2-

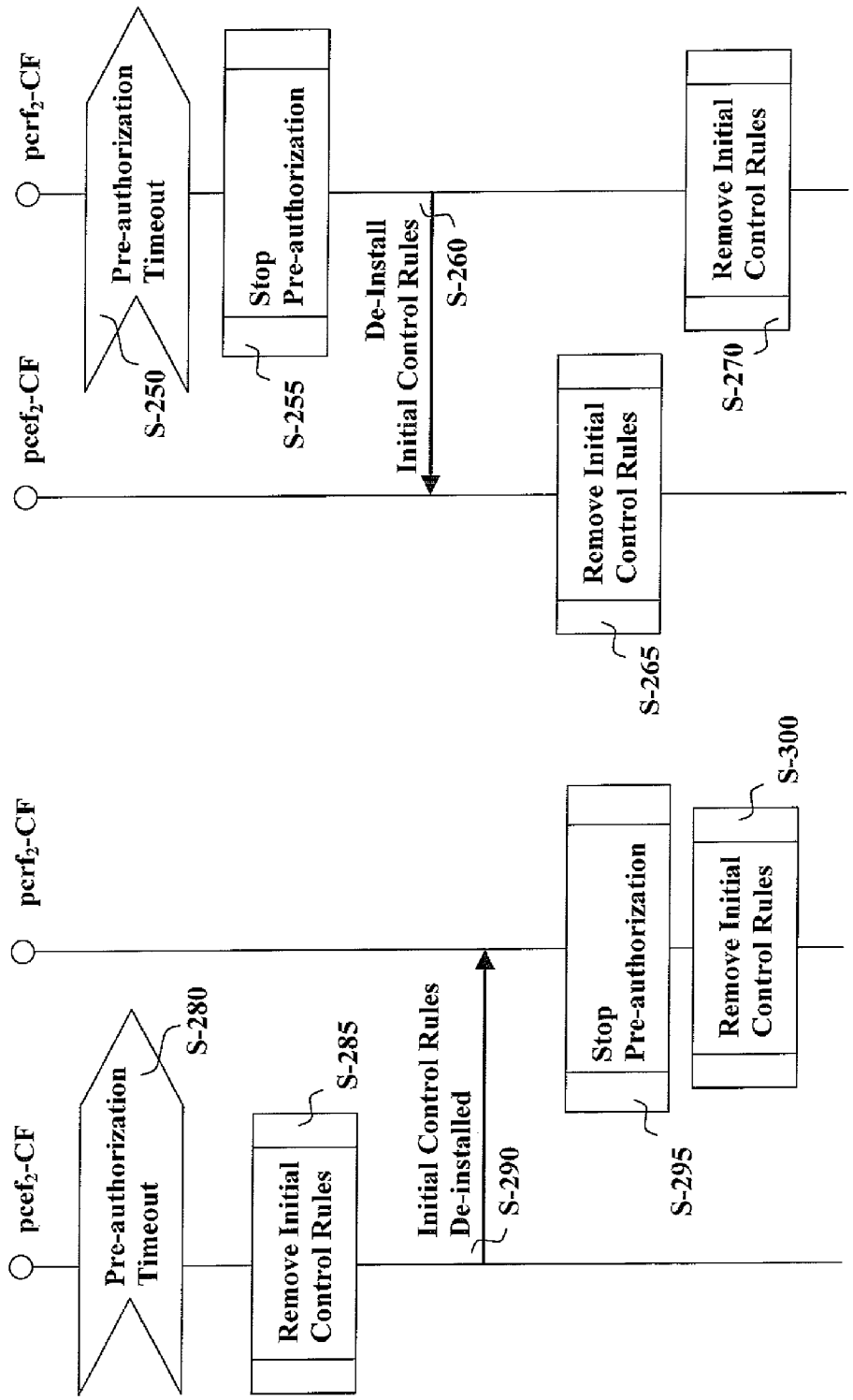
FIG.-2f1-
FIG.-2f2-

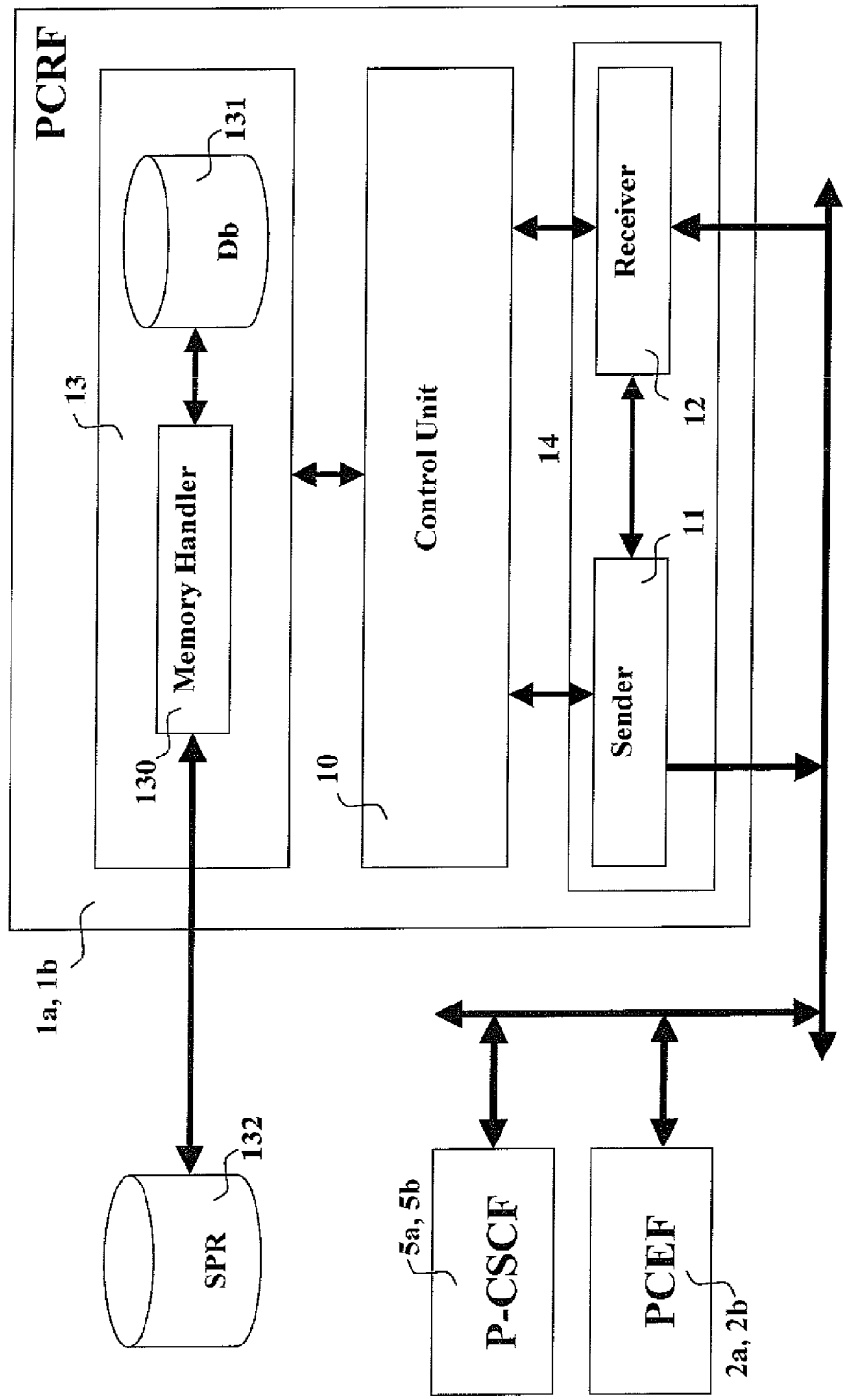
FIG.-3-

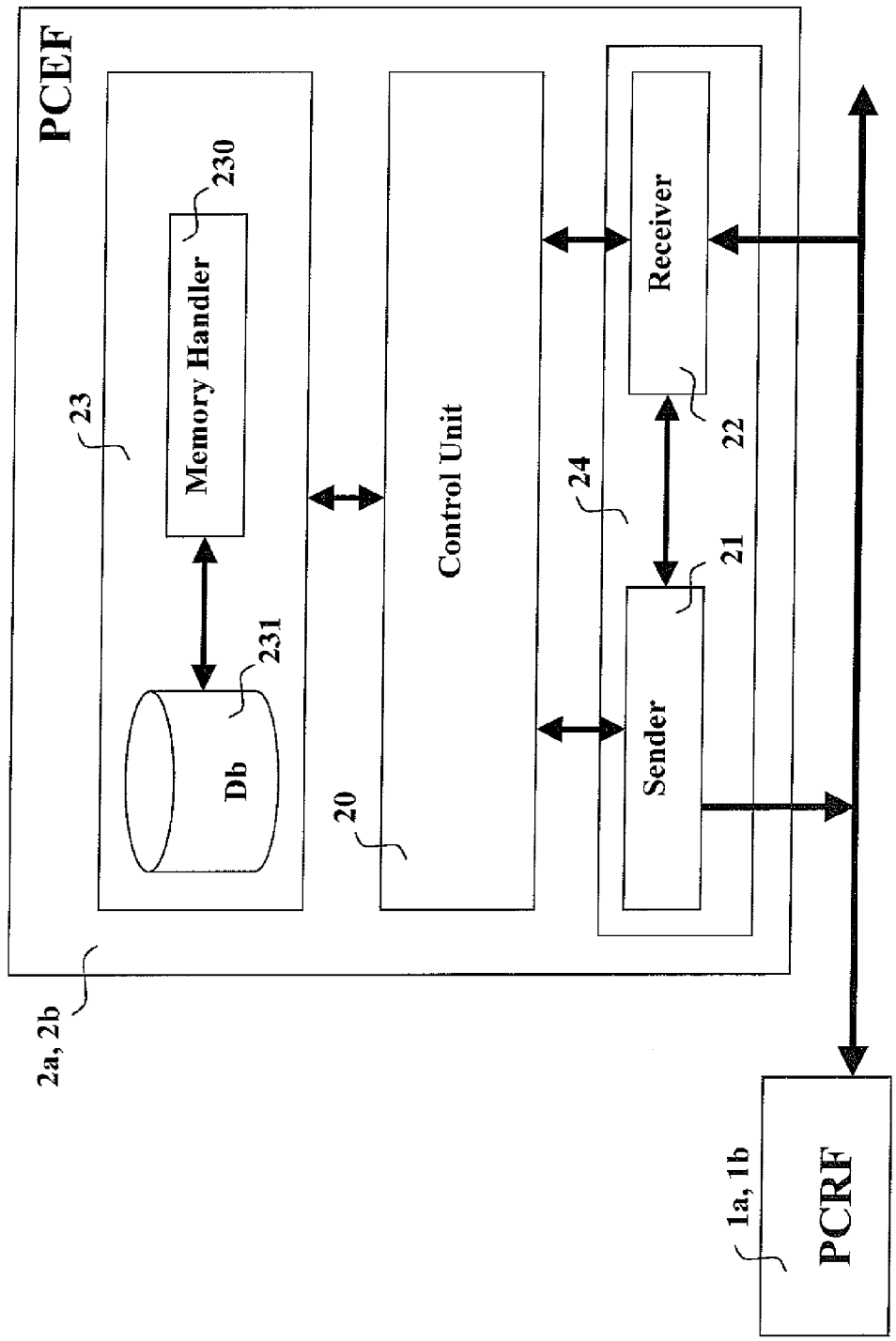
FIG.-4-

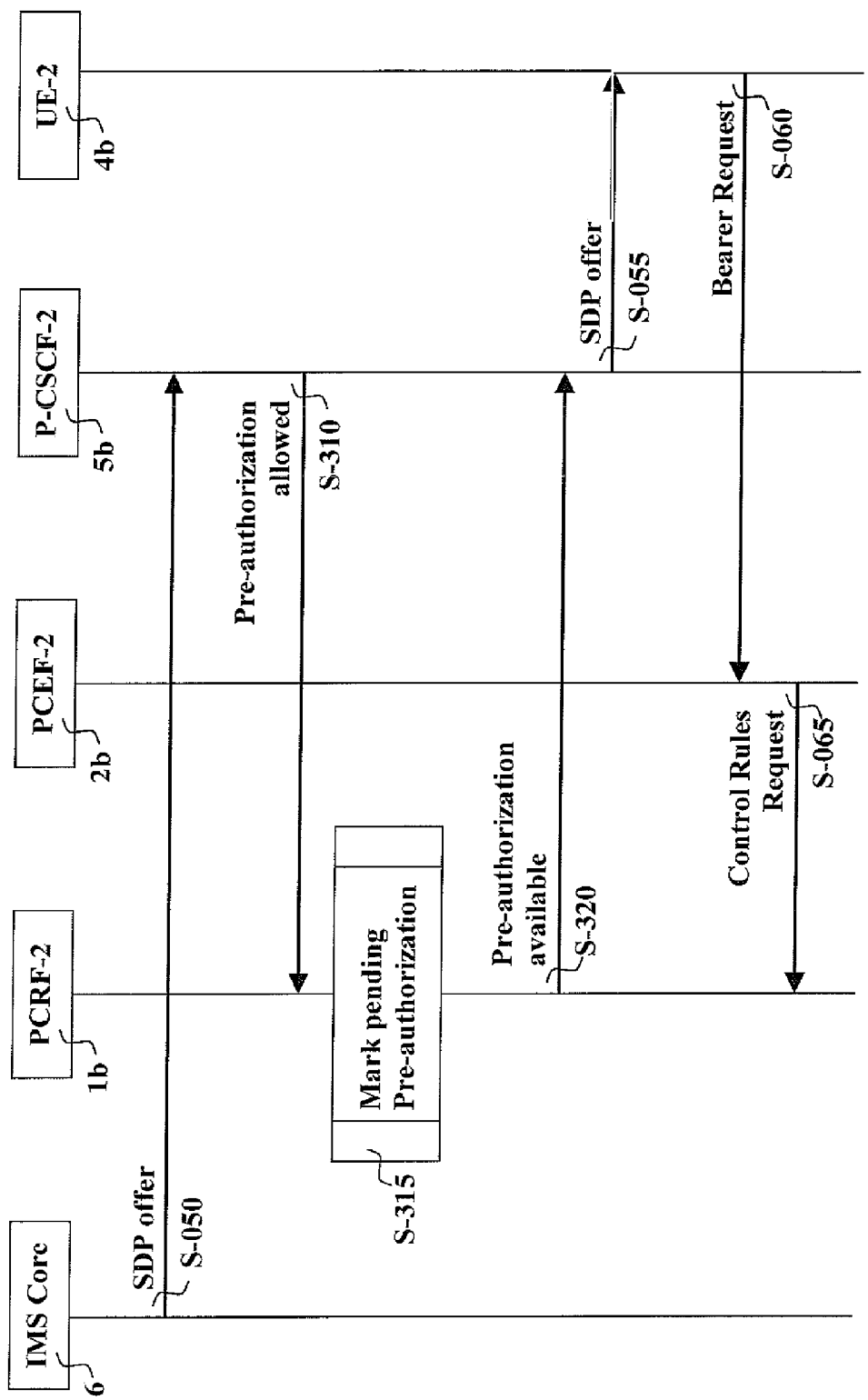
FIG.-5-

PRE-AUTHORIZATION OF BEARER SET-UP

TECHNICAL FIELD

The present invention generally relates to the acceptance of bearer requests from the media plane whilst negotiation of bearer is pending at the signalling plane. In particular, the invention relates to mechanisms for pre-authorizing a bearer request at a Policing and Charging Rules Function whilst the bearer is negotiated through entities of an IP Multimedia Subsystem.

BACKGROUND

An IP Multimedia Subsystem (hereinafter IMS) enables an operator of a Public Land Mobile Network (hereinafter PLMN) to offer their subscribers multimedia services based on and built upon Internet applications, services and protocols. These multimedia services may be particularly accessible via IMS applications.

A complete solution for the support of IMS applications, in accordance with 3GPP IMS-related technical specifications, includes terminals for the subscribers or users of the IMS, one or more IP-Connectivity Access Network (hereinafter IP-CAN), and specific functional elements of the IMS as described in 3GPP TS 23.228: "IP Multimedia Subsystem; Stage 2". An exemplary IP-CAN may be a GPRS core network with a GERAN and/or UTRAN radio access networks. Ongoing 3GPP Release 8 also covers a so-called SAE network as a new type of IP-CAN, in accordance with 3GPP TS 23.401.

Different services and applications can be offered on top of IMS. The IMS allows deployment of peer-to-peer applications such as Multimedia Telephony, Push-to-Talk over Cellular, real-time video sharing, etc, for which the transport connections are dynamically negotiated by a protocol exchange between two end-points. Such protocol exchange is conventionally carried out by coupled protocols such as the Session Initiation Protocol (hereinafter SIP) and the Session Description Protocol (hereinafter SDP) may be, namely a SIP/SDP exchange.

In order to provide a satisfactory and reliable service experience, operators need to take special care of the quality, effective charging and potential fraud on the use of services and IMS applications. To this end, a Policy and Charging Control (hereinafter PCC) architecture is provided, as disclosed in 3GPP TS 23.203, to help operators on the control of the above issues. Thus, the PCC architecture cooperates with the IMS in order to provide a selective control of IP flows, such as QoS, firewall, multiplexing, etc, as well as a selective handling of the negotiated IP flows.

This PCC architecture generally includes an Application Function (hereinafter AF) offering applications that require policy and charging control of resources in the bearer plane and wherein service characteristics are negotiated through in the signalling plane; a Policy and Charging Enforcement Function (hereinafter PCEF) providing service data flow detection, charging and policing enforcement over the traffic in the bearer plane and wherein the service is actually provided through; and a Policy and Charging Rules Function (hereinafter PCRF) providing control functions and installing rules at the PCEF to ensure that only authorized media flows are allowed and are applied the right QoS through the right bearer.

At present, the establishment of bearers can be initiated and managed by the network (hereinafter NW) or by the user equipment (hereinafter UE) via so-called NW-initiated or UE-initiated Bearer Control Procedures. In this respect, the present invention is originally aimed for UE-initiated Bearer Control Procedures, though its teaching may solve similar issues turning up in NW-initiated Bearer Control Procedures.

A conventional scenario may be where a user with a UE accesses the IMS through a Proxy Call Session Control Function (hereinafter P-CSCF) and gets IP connectivity via an IP-CAN such as GPRS. Where this scenario includes a PCC architecture, the AF is included in, or in close cooperation with, the P-CSCF; the PCEF may be included in, or in close cooperation with, a Gateway GPRS Support Node (hereinafter GGSN), a Packet Data Network Gateway (hereinafter PDN-GW), or any other network node depending on the selected IP-CAN; and the PCRF may be provided as a separate server logically located between the signalling plane and the bearer plane, or be integrated with the P-CSCF or the GGSN, or with any other network node.

In a traditional scenario, where the PCC architecture is used, a sequence for establishing an IMS session starts when the UE of an originating user submits a SIP Invite message including an SDP offer towards an originating P-CSCF acting as the entry to the IMS. This SDP offer is transmitted through IMS Core nodes, that is, those IMS entities of the originating and/or destination IMS network that, for the purpose of the present invention, are not essential for the understanding of the proposed solution. Upon receipt of a corresponding SDP answer to the originating offer after having negotiated the media, the P-CSCF, or rather the AF included therein, submits a corresponding QoS authorization towards the PCRF, whilst the P-CSCF forwards the received SDP answer towards the UE of the originating user, that is, the originating UE for the sake of simplicity. Afterwards, in a UE-init Bearer Control mode, the originating UE initiates the reservation of QoS resources, namely a so-called bearer request throughout the present specification, towards the PCC architecture, namely towards the PCEF which asks the PCRF for applicable control rules. In the current situation, the QoS authorization always reaches the PCRF before having been asked for applicable control rules for the bearer.

However, the 3GPP TS 23.228 states for Multimedia Telephony that, if provided with the appropriate rules, the reservation of bearer resources may be initiated by the UE during the initial SIP Invite request. In this situation, the PCRF receives a request to install control rules before having received any QoS Authorization from the P-CSCF, so that such request is rejected in a conventional PCC architecture.

SUMMARY

It is an object of the present invention to obviate at least some of the above disadvantages and provide for an enhanced PCC architecture wherein an, at least, temporary solution is offered to avoid rejection of a request to install control rules received before having received a corresponding QoS Authorization. In this respect, a simple solution may be the reattempt from the UE; however, such solution would not work in a scenario where the QoS Authorization is conditioned to a prior reservation of resources.

Thereby, the aim of the present invention is an enhanced PCC architecture wherein not only the problem of receiving a request to install control rules before having received a corresponding QoS Authorization is solved, but also that such enhanced PCC architecture solves the problem in scenarios where the QoS Authorization is conditioned to a prior reservation of resources.

The objects above are generally accomplished in accordance with the invention by providing a method of authorizing a request for a bearer resource received before having received a QoS authorization for said request, and enhanced entities of the PCC architecture cooperating to carry out such method.

Thus, in accordance with a first aspect of the present invention, there is provided a method of authorizing a request for a bearer resource received before having received a QoS authorization for said request, the method comprising the steps of: receiving a request for a bearer resource; determining that a QoS authorization has not been received yet for said request at a PCRF server; pre-authorizing said request for the bearer resource received before having received the QoS authorization; installing initial control rules applicable to the pre-authorized request towards a PCEF device; and updating the previously installed initial control rules with final control rules upon receipt of the QoS authorization.

This pre-authorization along with the submission of initial control rules towards the PCEF, before having received the QoS authorization, being a common inventive concept throughout the present specification. In particular, these initial control rules may include information elements selected from: a rule identifier; a gate status; an incomplete service data flow template, as obtainable from information provided by the user equipment; QoS information including a QoS class identifier "QCI", a guaranteed bit rate "GBR" and a maximum bit rate "MBR", as requested by the IP-CAN; and optional configured data such as charging information, service identifier, precedence, etc.

In this method, the initial control rules are temporary control rules valid only during a configurable time period without having received the QoS authorization at the PCRF server. That is, the pre-authorization in this method is valid only during a configurable time period, so that the method may further comprise a step of de-authorizing the bearer resource upon expiry of said time period without having received the QoS authorization. Moreover, the method may further comprise to this end a step of de-installing towards the PCEF device the initial control rules after expiry of said time period without having received the QoS authorization.

In an embodiment of the invention, the step in this method of installing the initial control rules towards the PCEF device may include a step of indicating that are temporary control rules valid only during a configurable time period. In this embodiment, the method may further comprise a step of receiving at the PCRF server an indication from the PCEF device informing that the initial control rules have been de-installed after expiry of said time period, and a step of removing said initial control rules.

For the purpose of controlling the configurable time period, this method may further include a step of timing said configurable time period during which the pre-authorization and the initial control rules are valid, and after which, without having received the QoS authorization, the corresponding bearer resource is de-authorized and the initial control rules are de-installed. In particular, the step in this method of timing the configurable time period may be carried out by at least one of the PCRF server and the PCEF device.

Regarding the final control rules of this method, these final control rules may include new control rules complementing the initial control rules, in which case the method may further include a step of indicating such complement from the PCRF server towards the PCEF device. If this is the case, the method may advantageously further comprise a step of adding said new control rules to the initial control rules previously installed at the PCEF device to configure the final control rules, without needing the removal and re-installation of unchanged initial control rules.

Alternatively, where the final control rules are new control rules, the method may further comprise a step of implicitly de-installing the initial control rules and a step of installing the final control rules towards the PCEF device.

In particular, the step in this method of installing initial control rules may include a step of indicating installation with a "gate status" set to disabled, so that the bearer resources are reserved but traffic is still prevented on such bearer resources.

As an additional advantage, this method may further include a step of obtaining a pre-authorization indication at the PCRF server from a P-CSCF server, which in particular may be the one in charge of providing the QoS authorization.

In accordance with a second aspect of the present invention, there is provided an enhanced PCRF server that comprises: a receiver for receiving a QoS authorization of a bearer resource and for further receiving a corresponding request for the bearer resource; a control unit for determining a set of control rules to be installed for handling the requested bearer resource once authorized; and a sender for installing said set of control rules towards a PCEF device. In this PCRF server, the control unit is arranged for pre-authorizing a request of a bearer resource, the request received before having received the QoS authorization; and the sender is arranged for installing initial control rules applicable to the pre-authorized request and for further updating the previously installed initial control rules with final control rules upon receipt of the QoS authorization.

As already commented above, the initial control rules in this PCRF server are temporary control rules valid only during a configurable time period without having received the QoS authorization.

In this respect, different alternatives may co-exist, likely depending on configuration options that may be established per PCEF device basis. In one embodiment, the time period during which the initial control rules are valid may be controlled in the PCRF server. To this end, the sender of the PCRF server may be arranged for de-installing towards the PCEF device the initial control rules after expiry of said time period. Not only the initial control rules, but also the pre-authorization in this PCRF server is valid only during a configurable time period upon which expiry, without having received the QoS authorization, the corresponding bearer resource may be de-authorized at the control unit of the PCRF server.

In another embodiment of the invention, the time period during which the initial control rules are valid may be controlled in the PCEF device. To this end, the sender of the PCRF server may be arranged for installing the initial control rules towards the PCEF device along with an indication of being temporary control rules valid only during a configurable time period. Under this embodiment, the receiver of the PCRF server may further be arranged for receiving an indication from the PCEF device informing that the initial control rules have been de-installed after expiry of said time period, and the control unit of the PCRF server may also be arranged for removing said initial control rules.

With regard to the final control rules, the PCRF server may be designed so that the final control rules include new control rules complementing the initial control rules. To this end, the sender of the PCRF server may be arranged for indicating such complement towards the PCEF device.

Alternatively, the final control rules in the PCRF server may be considered new control rules submitted to implicitly de-install the initial control rules towards the PCEF device.

In particular, and aligned with a corresponding technical feature of the above method, the initial control rules may be installed from the PCRF server towards the PCEF device with a "gate status" set to disabled.

In an embodiment of the invention, the PCRF server may be configured to carry out the pre-authorization on its own and triggered from its control unit; whereas in another embodiment of the invention, the pre-authorization may be carried out by the control unit of the PCRF server upon receipt in the receiver of a pre-authorization indication from the P-CSCF server. Irrespective of the embodiment followed in this respect, the QoS authorization for reserving a bearer may be received at the receiver of the PCRF server from the P-CSCF server.

In accordance with a third aspect of the present invention, there is provided an enhanced PCEF device for enforcing control rules on a per bearer resource basis, having a sender for submitting a request for a bearer resource, a receiver for receiving control rules to be installed for the bearer resource, and a control unit for applying the control rules to the bearer resource. In this PCEF device the receiver is arranged for receiving initial control rules applicable to said bearer resource, pre-authorized by the above PCRF server before having a QoS authorization available, and for receiving final control rules from the PCRF server to update said initial control rules, once the QoS authorization is available, and the control unit is arranged for updating said initial control rules with the final control rules upon receipt of such updating from the PCRF server.

As described above, the initial control rules in this PCEF device are temporary control rules valid only during a configurable time period without having received the final control rules from the PCRF server.

In this respect, and in accordance with an embodiment of the invention, the receiver of the PCEF device may further be arranged for receiving a de-installation of said initial control rules from the PCRF server and the control unit of the PCEF device may further be arranged for triggering a de-installation of said initial control rules.

Also in this respect, and in accordance with another embodiment of the invention, the receiver of the PCEF device may further be arranged for receiving the initial control rules from the PCRF server along with an indication of being temporary control rules valid only during a configurable time period. In this embodiment, the control unit of the PCEF device may further be arranged for triggering a de-installation of said initial control rules upon expiry of said time period. Moreover, also in this embodiment and aligned with a corresponding feature of the PCRF server, the sender of the PCEF device may further be arranged for submitting an indication towards the PCRF server informing that the initial control rules have been de-installed after expiry of said time period.

Aligned with corresponding embodiments for the PCRF server, where the final control rules include new control rules complementing the initial control rules, the receiver of the PCEF device may further be arranged for receiving an indication of such complement, and the control unit of the PCEF device may further be arranged for adding the new control rules to the initial control rules previously installed and for considering the addition as the final control rules. However, where the final control rules are new control rules, the control unit of the PCEF device may further be arranged for triggering the de-installation of the initial control rules in response to the receiver of the PCEF device receiving said final control rules.

Also aligned with an advantageous embodiment explained above, the receiver of the PCEF device may further be arranged for receiving an indication, along with the initial control rules, indicating installation with a "gate status" set to disabled.

The invention may be practised by one or more computer programs, loadable into an internal memory of a number of computers, each one with input and output units as well as with a processing unit, the computer program comprising executable code adapted to carry out method steps according to the above method when running in the computer. The executable code of the one or more computer programs may be recorded in a carrier readable in a computer.

BRIEF DESCRIPTION OF THE DRAWINGS

The features, objects and advantages of the invention will become apparent by reading this description in conjunction with the accompanying drawings, in which:

FIG. 1 represents a PCC architecture of an exemplary scenario where a first user connected through a GPRS network as IP-CAN holds an IMS session with a second user connected through evolved packet system (hereinafter EPS) as IP-CAN.

FIGS. 2a and 2d illustrate a sequence of actions to be followed in accordance with the invention at the originating side of an IMS session to be established in an exemplary scenario for Multimedia Telephony.

FIGS. 2b and 2c illustrate a sequence of actions to be followed in accordance with the invention at the destination side of an IMS session to be established in an exemplary scenario for Multimedia Telephony.

FIG. 2e1 illustrates an exemplary termination of a pre-authorization at the originating side of an IMS session where the timing is carried out in the PCRF sever.

FIG. 2e2 illustrates an exemplary termination of a pre-authorization at the originating side of an IMS session where the timing is carried out in the PCEF device.

FIG. 2f1 illustrates an exemplary termination of a pre-authorization at the destination side of an IMS session where the timing is carried out in the PCRF sever.

FIG. 2f2 illustrates an exemplary termination of a pre-authorization at the destination side of an IMS session where the timing is carried out in the PCEF device.

FIG. 3 illustrates structural elements included in a PCRF server, as well as connections towards other architectural nodes.

FIG. 4 illustrates structural elements included in a PCEF device, as well as connections towards other architectural nodes.

FIG. 5 illustrates an exemplary embodiment of the sequence of actions that may be carried out to obtain at a PCRF server an indication of allowance of pre-authorization from a P-CSCF where media components are negotiated through.

DETAILED DESCRIPTION

The following describes some preferred embodiments for supporting the reservation of bearer resources before having received a corresponding QoS Authorization for such reservation.

FIG. 2a-2d illustrate the most significant actions to be followed at the originating side where a first UE 4a, namely UE-1, invites a second UE 4b, namely UE-2, at a destination side to establish a media communication through the IMS. As illustrated in FIG. 1, said UE-1 4a establishes an IP-CAN session through an exemplary GPRS access network so that the media can be submitted towards the destination network via a Serving GPRS Support Node (hereinafter SGSN) 8a and a GGSN 7a. In this respect, a first PCEF device 2a, namely PCEF-1, is included in the GGSN 7a and is in charge of handling bearer resources for transport of such media and of enforcing control rules for the corresponding IP-flows through the bearer. On the other hand, the signalling required to negotiate the media transmission is exchanged between the UE-1 4*a* and the UE-2 4*b* through the IMS network. In particular and referring to the illustration in FIG. 1, the UE-1 4*a* in the originating network exchanges signalling related to the IMS session with a first P-CSCF 5*a*, namely P-CSCF-1, in the originating side of its IMS network, whereas the UE-2 4*b* in the destination network exchanges signalling related to the IMS session with a second P-CSCF 5*b*, namely P-CSCF-2, in the destination side of its IMS network. Between the P-CSCF-1 5*a* and the P-CSCF-2 5*b* there may be number of intermediate IMS nodes, not significant for the purpose of the present invention, and represented by a so-called IMS Core 6 throughout this specification. In this exemplary scenario shown in FIG. 1, the UE-2 4*b* establishes an IP-CAN session through an exemplary evolved packet system (hereinafter EPS) so that the media can be submitted towards the originating network via a Serving Gateway (hereinafter SGW) 8*b* and a Packet Data Network Gateway (hereinafter PDN-GW) 7*b*. In this respect, a second PCEF device 2*b*, namely PCEF-2, is included in the PDN-GW 7*b* and is in charge, as for the originating side, of handling bearer resources for transport of such media and of enforcing control rules for the corresponding IP-flows through the bearer resource. The GGSN 7*a* and the PDN-GW 7*b* indeed transfer media to each other through other network nodes not shown for the sake of clarity. Moreover, both P-CSCF-1 and P-CSCF-2 respectively located at originating and destination sides, respectively communicate with a first PCRF server 1*a*, namely PCRF-1, and a second PCRF server 1*b*, namely PCRF-2, both PCRF-1 and PCRF-2 installing appropriate control rules to respective PCEF-1 and PCEF-2. Furthermore, P-CSCF-1, P-CSCF-2, or both may include a respective AF, namely AF-1 and AF-2, in accordance with the PCC architecture described above.

The sequence of actions illustrated in FIG. 2*a* starts with a step S-010 of submitting an invitation to negotiate a media communication, which includes a so-called SDP offer with significant descriptions of media components, from an originating UE-1 4*a* towards a second UE at a destination side through the IMS. This invitation to negotiate the media communication is received at the P-CSCF-1 5*a* in the originating side of the IMS, and forwarded towards the IMS Core 6 during a step S-015.

The sequence of actions occurring at the destination side continue as illustrated in FIG. 2*b*. However, in a scenario where the above problem aiming the present invention turns up, the reservation of bearer resources may be initiated by the originating UE-1 4*a* immediately after having submitted the initial invitation request. Accordingly, and back to sequence of actions illustrated in FIG. 2*a*, the originating UE-1 4*a* submits a request for bearer resources during a step S-020 towards the PCEF-1 2*a* likely located in the exemplary GGSN 7*a* of the IP-CAN in the originating side. Responsive to receipt of such request for bearer resources, the PCEF-1 2*a* submits a request for control rules during a step S-025 towards the PCRF-1 1*a* at the originating side. Upon receipt of such request for control rules in the PCRF-1 1*a*, the PCRF-1 determines during a step S-030 that a QoS authorization has not been received yet for such bearer request and initial control rules to be installed. Thereafter, the PCRF-1 1*a* initiates a pre-authorization procedure during a step S-035, procedure which in an embodiment of the invention may trigger a timing of a configured time period during which the initial control rules and the pre-authorization are valid, and in another embodiment includes a step of indicating towards the PCEF-1, along with the initial control rules, that the initial control rules are temporary control rules valid only during a configurable time period. As a result, the PCRF-1 1*a* installs towards the PCEF-1 2*a* said initial control rules during a step S-040 and marks the Qos authorization is pending, and the PCEF-1, once said initial control rules are installed, submits during a step S-045 a successful response towards the originating UE-1 4*a*.

Advantageously, the installation of initial control rules includes an indication submitted towards the PCEF device 2*a*, 2*b* indicating the installation with a "gate status" set to disabled, so that the bearer resources are reserved but traffic is still prevented on such bearer resources.

As already commented above, these initial control rules may include information elements selected from: a rule identifier; a gate status; an incomplete service data flow template, as obtainable from information provided by the user equipment; QoS information including a QoS class identifier "QCI", a guaranteed bit rate "GBR" and a maximum bit rate "MBR", as requested by the IP-CAN; and optional configured data such as charging information, service identifier, precedence, etc.

At this stage, nothing significant occurs at the originating side until receiving either an SDP answer from the destination side or, under the above embodiment of timing the time period in the PCRF-1, a timeout of said time period, what is further described.

Before describing the next sequence of actions to occur at the originating side, and given that a possible termination requires the reception of an SDP answer from the destination side, the following describes the sequence of actions occurring upon receipt of the originating SDP answer at the destination side, as illustrated in FIG. 2*b*.

Thus, the sequence of actions occurring at the destination side, as FIG. 2*b* illustrates, starts when the IMS Core 6 submits towards the destination P-CSCF-2 5*b* the originating SDP offer during a step S-050. Then, the P-CSCF-2 5*b* forwards such SDP offer during a step S-055 towards the destination UE-2 4*b*, and said destination UE-2 may thus submit a request for bearer resources during a step S-060 towards the PCEF-2 2*b*. This PCEF-2 may be located in an exemplary GGSN of the IP-CAN not illustrated in any drawing, as in the originating side, or may likely be located in a PDN-GW 7*b* as FIG. 1 exemplary illustrates. Responsive to the receipt of such request for bearer resources, the PCEF-2 2*b* submits a request for control rules during a step S-065 towards the PCRF-2 1*b* at the destination side. Upon receipt of such request for control rules in the PCRF-2 1*b*, the PCRF-2 determines during a step S-070, as explained above for the originating side, that a QoS authorization has not been received yet for such bearer request and initial control rules to be installed. As at the originating side, the PCRF-2 1*b* initiates a pre-authorization procedure during a step S-075 and marks the Qos authorization is pending, procedure which in an embodiment of the invention may trigger a timing of a configured time period during which the initial control rules and the pre-authorization are valid, and in another embodiment includes a step of indicating towards the PCEF-2, along with the initial control rules, that the initial control rules are temporary control rules valid only during a configurable time period. As a result, the PCRF-2 1*b* installs towards the PCEF-2 2*b* said initial control rules during a step S-080, and the PCEF-2, after having installed said initial control rules, submits during a step S-085 a successful response towards the destination UE-2 4*b*.

Advantageously, the installation of initial control rules includes an indication submitted from the PCRF server 1*a*, 1*b* towards the PCEF device 2*a*, 2*b* indicating the installation with a "gate status" set to disabled, so that the bearer resources are reserved but traffic is still prevented on such bearer resources.

Initial rules that, as for the originating side, may include information elements selected from: a rule identifier; a gate status; an incomplete service data flow template, as obtainable from information provided by the user equipment; QoS information including a QoS class identifier "QCI", a guaranteed bit rate "GBR" and a maximum bit rate "MBR", as requested by the IP-CAN; and optional configured data such as charging information, service identifier, precedence, etc.

A conventional PCRF server may comprise a receiver 12 for receiving a QoS authorization of a bearer resource and for receiving a corresponding request for the bearer resource; a control unit 10 for determining a set of control rules to be installed for handling the requested bearer resource once authorized; and a sender 11 for installing said set of control rules towards the PCEF device 2a, 2b. However, a PCRF server 1a, 1b may be adapted in accordance with the invention as illustrated in FIG. 3, so that the control unit 10 is arranged for pre-authorizing the request of a bearer resource, the request received before having received the QoS authorization; and the sender 11 is arranged for installing the initial control rules applicable to the pre-authorized request.

A conventional PCEF device for enforcing control rules on a per bearer resource basis, may comprise a sender 21 for submitting a request for a bearer resource, a receiver 22 for receiving control rules to be installed for the bearer resource, and a control unit 20 for applying the control rules to the bearer resource. However, a PCEF device 2a, 2b may be adapted in accordance with the invention as illustrated in FIG. 4, so that the receiver 22 is arranged for receiving the initial control rules applicable to said bearer resource pre-authorized by the PCRF server 1a, 1b before having a QoS authorization available.

Moreover, the sender 11 of the PCRF device 1a, 1b may further be arranged for submitting an indication towards the PCEF device 2a, 2b, along with the initial control rules, indicating that the initial control rules are temporary control rules valid only during a configurable time period to be controlled at the PCEF device 2a, 2b; and the receiver 22 of the PCEF device 2a, 2b may further be arranged for receiving such indication, along with the initial control rules, and the control unit 20 of the PCEF device 2a, 2b may further be arranged for timing such configurable time period.

Furthermore, the sender 11 of the PCRF device 1a, 1b may further be arranged for submitting an indication towards the PCEF device 2a, 2b, along with the initial control rules, indicating installation with a "gate status" set to disabled; and the receiver 22 of the PCEF device 2a, 2b may further be arranged for receiving an indication, along with the initial control rules, indicating installation with a "gate status" set to disabled.

The sequence of actions continues at the destination side as illustrated in FIG. 2c wherein the destination UE-2 4b, after having successfully reserved bearer resources, can return towards the originating side a corresponding SDP answer during a step S-090.

This SDP answer is received in the P-CSCF-2 5b of the destination side which, prior to forwarding such SDP answer towards the originating side, submits the QoS authorization towards the PCRF-2 1b.

Upon receipt of the QoS authorization, and based on media component descriptions included therein, the PCRF-2 1b determines during a step S-100 final control rules to be installed towards the PCEF-2, and stops the ongoing pre-authorization procedure for any embodiment of those explained above in this respect and resets the mark of Qos authorization being pending. In particular, where the time period is running at the PCRF-2 1b, a corresponding timer is stopped therein.

Then, the PCRF-2 1b submits during a step S-110 the final control rules to be installed at the PCEF-2 2b. These final control rules may include new control rules complementing the initial control rules, in which case the PCRF-2 1b may indicate such complement towards the PCEF-2 2b, or the final control rules may be new control rules, in which case the PCRF-2 1b may also indicate such event towards the PCEF-2 2b. In particular, where the final control rules are new control rules, its submission may be considered an implicit de-installation of initial control rules.

These final control rules may thus be completed or amended in accordance with service information received along with the Qos authorization and, in particular, in accordance with the media component descriptions included therein. That is, these final control rules may include information elements selected from: the rule identifier; the gate status; the complete service data flow template; the complete QoS information; and charging information, service identifier, precedence, etc, as received along with the QoS authorization.

To this end, the PCRF server 1a, 1b, as illustrated in FIG. 3 may be adapted in accordance with the invention so that the sender 11 is arranged for further updating the previously installed initial control rules with final control rules upon receipt of the QoS authorization. Moreover, the sender 11 may be arranged for indicating towards the PCEF device 2a, 2b whether the final control rules complement the initial control rules, or are new control rules to replace the initial control rules. Aligned with this embodiment, the receiver 22 of the PCEF device 2a, 2b may be arranged for receiving an indication that the new control rules complement the initial control rules, and the control unit 20 may further be arranged for adding the new control rules to the initial control rules previously installed and for considering the addition as the final control rules; and, where the final control rules are new control rules, the control unit 20 may further be arranged for triggering a de-installation of the initial control rules responsive to the receiver 22 receiving said final control rules.

Still with reference to FIG. 2c, the PCEF-2 2b, upon receipt of the final control rules, initiates a procedure of updating the initial with these final control rules during a step S-115. In this respect, where there is an indication of being a complement to the initial control rules, this procedure may be adapted for adding said new control rules to the initial control rules previously installed in order to configure the final control rules, without needing removal and re-installation of unchanged initial control rules. On the other hand, where there is an indication of being considered new control rules, the procedure is adapted for implicitly de-installing the initial control rules and then installing the final control rules.

After having successfully installed the final control rules, the PCEF-2 confirms such updating towards the PCRF-2 1b during a step S-120, and the PCEF-2 confirms the QoS authorization towards the P-CSCF-2 5b during a step S-125. Then, the P-CSCF-2 can eventually forward the SDP answer towards the originating side via the IMS Core 6 during a step S-130.

The sequence of actions now continues at the originating side as illustrated in FIG. 2d wherein the IMS Core 6 forwards the SDP answer towards the P-CSCF-1 5a in the originating side during a step S-140. This P-CSCF-1 5a at the originating side, prior to forwarding such SDP answer towards the UE-1 4a, submits the QoS authorization towards the PCRF-1 1a.

In a similar manner as at the destination side, upon receipt of the QoS authorization and based on media component descriptions included therein, the PCRF-1 1*a* determines during a step S-150 final control rules to be installed towards the PCEF-1 2*a*, resets the mark of QoS authorization being pending, and stops the ongoing pre-authorization procedure for the applicable embodiment of those explained above in this respect. That is, where the time period is running at the PCRF-1 1*a*, a corresponding timer is stopped therein; otherwise, other corresponding indicators may be reset.

Then, the PCRF-1 1*a* submits during a step S-160 the final control rules to be installed at the PCEF-1 2*a*. These final control rules may include new control rules complementing the initial control rules, in which case the PCRF-1 1*a* may indicate such complement towards the PCEF-1 2*a*, or the final control rules may be new control rules, in which case the PCRF-1 1*a* may also indicate such event towards the PCEF-1 2*a*.

Also in a similar manner as done at the destination side upon receipt of the final control rules, the PCEF-1 2*a* initiates a procedure of updating the initial with these final control rules during a step S-165. In this respect, where there is an indication of being a complement to the initial control rules, this procedure may be adapted for adding said new control rules to the initial control rules previously installed in order to configure the final control rules, without needing removal and re-installation of unchanged initial control rules. On the other hand, where there is an indication of being considered new control rules, the procedure is adapted for implicitly de-installing the initial control rules and then installing the final control rules.

Moreover, the PCEF device 2*a*, 2*b* may be adapted in accordance with the invention as illustrated in FIG. 4, so that the receiver 22 is arranged for receiving final control rules from the PCRF server 1*a*,1*b* to update said initial control rules once the QoS authorization is available, and the control unit 20 is arranged for updating said initial control rules with the final control rules upon receipt of such updating from the PCRF server 1*a*, 1*b*.

Still with reference to FIG. 2*d*, once the final control rules have successfully been installed, the PCEF-1 2*a* confirms such updating towards the PCRF-1 1*a* during a step S-170, and the PCRF-1 confirms the QoS authorization towards the P-CSCF-1 5*a* during a step S-175. Afterwards, the P-CSCF-1 can eventually forward the SDP answer towards the UE-1 4*a* during a step S-180.

The description of the sequence of actions hereinbefore, namely those with reference to the illustrations in FIG. 2*a*-2*d*, correspond to the pre-authorization proceedings that can be followed at any of the originating side, the destination side, or both, where such pre-authorization is followed by a QoS authorization expected under currently existing procedures to establish an IMS session between an originating and a destination end.

In this respect, the network may be organized in such a manner that only the originating side, only the destination side, or both sides are adapted for allowing pre-authorization of a bearer reservation before having received a corresponding QoS authorization with the descriptions of the media components for the IMS session.

The present invention thus provides for a solution to avoid rejection of a request to install control rules received before having received a corresponding QoS Authorization, even in a scenario where the QoS Authorization is conditioned to a prior reservation of resources.

Nevertheless, this pre-authorization cannot be regarded as a final authorization replacing the QoS authorization with the descriptions of the media components for the IMS session. Therefore, the present invention provides for a configurable time period during which the pre-authorization and the initial control rules are valid whilst awaiting the receipt of said QoS authorization. The timing of this configurable time period may be carried out either at the PCRF server 1*a*, 1*b*, or at the PCEF device 2*a*, 2*b* of the originating or destination side of the IMS session in accordance with different embodiments of the present invention and, in particular, nothing in this teaching prevents from timing at the PCRF server 1*a* at the originating side and timing at the PCEF device 2*b* at the destination side, or vice versa. These different combinations are described in the following with reference to the sequence of actions shown in FIGS. 2*e*1, 2*e*2, 2*f*1 and 2*f*2.

Thus, after having installed the initial control rules at the PCEF-1 2*a* during the step S-040 and having submitted a successful response to the request of bearer resources towards the originating UE-1 4*a* during the step S-045, as illustrated in FIG. 2*a*, a first embodiment of timing at the originating side is illustrated in FIG. 2*e*1 wherein the PCRF-1 1*a* controls the configurable time period. Under this embodiment, the QoS authorization expected to be received during the step S-145, as explained above in respect of FIG. 2*d*, is not received upon expiration during a step S-200 of the configurable time period. Where said time period has expired at the PCRF-1 1*a* during the step S-200, the pre-authorization procedure is stopped during a step S-205, the corresponding bearer resource is de-authorized, the mark of QoS authorization pending is reset and an instruction to de-install the initial control rules is submitted towards the PCEF-1 2*a* during a step S-210. The PCEF-1 2*a* receiving such instruction removes the initial control rules during a step S-215 and may submit an indication towards the originating UE-1 indicating the release of corresponding bearer resources.

To this end, and given that the initial control rules are temporary control rules valid only during a configurable time period without having received the QoS authorization, the sender 11 of the PCRF server 1*a*, 1*b*, as illustrated in FIG. 3, may be arranged for de-installing towards the PCEF device 2*a*, 2*b* the initial control rules after expiry of said time period. Aligned with this embodiment, the receiver 22 of the PCEF device 2*a*, 2*b*, as illustrated in FIG. 4, may further be arranged for receiving a de-installation of said initial control rules from the PCRF server 1*a*, 1*b*, and the control unit 20 of the PCEF device may further be arranged for triggering a de-installation of said initial control rules.

Still in the situation where the initial control rules had been installed at the PCEF-1 2*a* during the step S-040 and the successful response to the request of bearer resources had been submitted towards the originating UE-1 4*a* during the step S-045, as illustrated in FIG. 2*a*, a second embodiment of timing at the originating side is illustrated in FIG. 2*e*2 wherein the PCEF-1 2*a* controls the configurable time period. Under this second embodiment illustrated in FIG. 2*e*2, the instruction to install final control rules expected to be received during the step S-160, as explained above in respect of FIG. 2*d*, is not received upon expiration during a step S-230 of the configurable time period. Where said time period has expired at the PCEF-1 2*a* during the step S-230, the initial control rules are removed at the PCEF-1 2*a* during a step S-235 and an indication is submitted during a step S-240 towards the PCRF-1 1*a* indicating that the initial control rules have been de-installed and, implicitly, the expiration of the pre-authorization. The PCRF-1 1*a*, upon receipt of such indication, terminates the pre-authorization procedure during a step S-245. As for the first procedure, the PCEF-1 may submit an indication towards the originating UE-1 indicating the release of corresponding bearer resources.

To this end, and given that the initial control rules are temporary control rules valid only during a configurable time period without having received the QoS authorization, the control unit 20 of the PCEF device 2a, 2b, as illustrated in FIG. 4, may further be arranged for triggering a de-installation of said initial control rules upon expiry of said time period, and the sender 21 of the PCEF device 2a, 2b may be arranged for submitting an indication towards the PCRF server 1a, 1b informing that the initial control rules have been de-installed after expiry of said time period; whereas the receiver 12 of the PCRF server 1a, 1b, as illustrated in FIG. 3, may be arranged for receiving an indication from the PCEF device 2a, 2b informing that the initial control rules have been de-installed after expiry of said time.

On the other hand, similar embodiments may be applied at the destination side. Thus, after having installed the initial control rules at the PCEF-2 2b during the step S-080 and having submitted a successful response to the request of bearer resources towards the destination UE-2 4b during the step S-085, as illustrated in FIG. 2b, a first embodiment of timing at the destination side is illustrated in FIG. 2/1 wherein the PCRF-2 1b controls the configurable time period. Under this embodiment, the QoS authorization expected to be received during the step S-095, as explained above in respect of FIG. 2c, is not received upon expiration during a step S-250 of the configurable time period. Where said time period has expired at the PCRF-2 1b during the step S-250, the pre-authorization procedure is stopped during a step S-255, and an instruction to de-install the initial control rules is submitted towards the PCEF-2 2b during a step S-260. The PCEF-2 2b receiving such instruction removes the initial control rules during a step S-265 and may submit an indication towards the destination UE-2 indicating the release of corresponding bearer resources. In this embodiment, as well as in the corresponding one at the originating side, the PCRF-2 1b may also remove the initial control rules during a step S-270, if stored on the basis of this pre-authorization.

To this end, depending on the implementation, the control unit 10 of the PCRF server 1a, 1b, in the originating side as well as in the destination side, may also be arranged for removing said initial control rules.

Still in the situation where the initial control rules had been installed at the PCEF-2 2b during the step S-080 and the successful response to the request of bearer resources had been submitted towards the destination UE-2 4b during the step S-085, as illustrated in FIG. 2b, a second embodiment of timing at the destination side is illustrated in FIG. 2/2 wherein the PCEF-2 2b controls the configurable time period. Under this second embodiment illustrated in FIG. 2/2, the instruction to install final control rules expected to be received during the step S-110, as explained above in respect of FIG. 2c, is not received upon expiration during a step S-280 of the configurable time period. Where said time period has expired at the PCEF-2 2b during the step S-280, the initial control rules are removed at the PCEF-2 2b during a step S-285 and an indication is submitted during a step S-290 towards the PCRF-2 1b indicating that the initial control rules have been de-installed and, implicitly, the expiration of the pre-authorization. The PCRF-2 1b, upon receipt of such indication, terminates the pre-authorization procedure during a step S-295 and may also remove the initial control rules during a step S-300, if stored on the basis of this pre-authorization. As for the first procedure, the PCEF-2 may also submit an indication towards the destination UE-2 indicating the release of corresponding bearer resources.

Regarding the capability of pre-authorizing a request for a bearer resource, the present invention provides for two main embodiments. In a first embodiment, the PCRF server 1a, 1b is configured to decide and allow such pre-authorization on its own; whereas in a second embodiment, the PCRF server 1a, 1b in the originating or destination side obtains such permit from a P-CSCF 5a, 5b in said originating or destination side. In this respect, the sequence of actions illustrated in FIG. 2a-2d, 2e1, 2e2, 2f1 and 2f2 may assume any of these two embodiments, namely the PCRF server 1a, 1b being configured to decide and allow such pre-authorization on its own or the PCRF server 1a, 1b obtaining such permit from the P-CSCF 5a, 5b. Notwithstanding this, the sequence of actions illustrated in FIG. 2a-2d, 2e1, 2e2, 2f1 and 2f2 may also assume only the second embodiment as described in the following.

Thus, FIG. 5 illustrates an exemplary embodiment where the P-CSCF-2 5b in the destination side, upon receiving the SDP offer during the step S-050 and before forwarding it to the destination UE-2 4b during the step S-055 as described above in respect of FIG. 2b, submits during a step S-310 an indication towards the PCRF-2 1b at the destination side indicating that the pre-authorization is allowed. The PCRF-2 1b receiving such indication marks during a step S-315 a pre-authorization pending for a further request for a bearer resource from the destination UE-2 4b, and returns towards the P-CSCF-2 5b during a step S-320 a confirmation of having enabled the further pre-authorization. Once such confirmation is received, the P-CSCF-2 5b may continue with the forwarding the SDP offer towards the destination UE-2 4b during the step S-055 and the next sequence of actions as illustrated in FIG. 2b, namely the request for bearer resources during the step S-060 towards the PCEF-2 2b and, responsive to the receipt of such request for bearer resources, the PCEF-2 2b submitting the request for control rules during the step S-065 towards the PCRF-2 1b at the destination side.

This particular embodiment exemplary illustrated with reference to FIG. 5 in the destination side may also effectively be carried out by corresponding entities in the originating side, namely the P-CSCF-1 5a and the PCRF-1 1a.

To this end, the receiver 12 of the PCRF server 1a, 1b may be arranged for receiving a pre-authorization indication from the P-CSCF server 5a, 5b and the control unit 10 of the PCRF server 1a, 1b may be arranged for carrying out this pre-authorization in response to said pre-authorization indication.

Moreover, and in accordance with a further aspect of the invention, there is also provided a P-CSCF server 5a, 5b, in the originating side or destination side of the IMS session, where a given user 4a, 4b accesses the IMS through for communicating with another end user 4b, 4a. This P-CSCF conventionally comprises a sender for submitting a QoS authorization towards the PCRF server 1a, 1b, which is in charge of providing control functions and installing control rules. In accordance with this further aspect of the invention, the P-CSCF server may be adapted so that the sender is arranged for submitting during a step S-310 a pre-authorization of a request of a bearer resource before having received significant descriptions of media components negotiated between the given user and the another end user.

In particular, and depending on the IP-CAN where the originating or destination user accesses the IMS through, the PCEF device 2a, 2b may be included in a GGSN 7a or in a PDN-GW 7b.

Regarding implementation of embodiments, the invention can be realized by a computer program, which is loadable into an internal memory of a computer that includes input and output units as well as a processing unit. This computer program comprises executable code portions adapted to carry out sequences of actions described under the above embodiments when running in the computer. In particular, the computer program may be recorded in a carrier computer-readable medium, such as a CD-ROM.

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A method of authorizing a request for a bearer resource received before having received a Quality of Service (QoS) authorization for the request, the method comprising the steps of:
receiving the request for a bearer resource; and
determining that the QoS authorization has not been received for the request at a Policy and Charging Rules Function (PCRF) server;
pre-authorizing the request for the bearer resource received before having received the QoS authorization;
installing initial control rules applicable to the pre-authorized request towards a Policy and Charging Enforcement Function (PCEF) device, wherein the initial control rules are temporary control rules valid only during a configurable time period without having received the QoS authorization at the PCRF server; and
updating the previously installed initial control rules with final control rules upon receipt of the QoS authorization.

2. The method of claim 1, wherein the pre-authorization is valid only during the configurable time period, and further comprising a step of de-authorizing the bearer resource upon expiry of the time period without having received the QoS authorization.

3. The method of claim 2, further comprising a step of de-installing towards the PCEF device the initial control rules after expiry of the time period without having received the QoS authorization.

4. The method of claim 1, wherein the step of installing the initial control rules towards the PCEF device includes a step of indicating that the initial control rules are temporary control rules valid only during the configurable time period.

5. The method of claim 4, further comprising a step of receiving at the PCRF server an indication from the PCEF device informing that the initial control rules have been de-installed after expiry of the time period, and a step of removing the initial control rules.

6. The method of claim 1, wherein the final control rules include new control rules complementing the initial control rules, and the method further includes a step of indicating such complement from the PCRF server towards the PCEF device.

7. The method of claim 6, further comprising a step of adding the new control rules to the initial control rules previously installed at the PCEF device to configure the final control rules.

8. The method of claim 1, wherein the final control rules are new control rules, and the method further comprising a step of implicitly de-installing the initial control rules and a step of installing the final control rules towards the PCEF device.

9. The method of claim 1, wherein the step of installing initial control rules includes a step of indicating installation with a gate status set to disabled.

10. The method of claim 1, further including a step of timing a configurable time period during which the pre-authorization and the initial control rules are valid and after which, without having received the QoS authorization, the corresponding bearer resource is de-authorized and the initial control rules are de installed.

11. The method of claim 10, wherein the step of timing the configurable time period is carried out by at least one of the PCRF server and the PCEF device.

12. The method of claim 1, further including a step of obtaining a pre-authorization indication at the PCRF server from a Proxy Call Session Control Function (P-CSCF) server.

13. A Policy and Charging Rules Function (PCRF) server comprising:
a receiver for receiving a Quality of Service (QoS) authorization of a bearer resource and for further receiving a corresponding request for the bearer resource;
a controller for determining a set of control rules to be installed for handling the requested bearer resource once authorized;
a transmitter for installing the set of control rules towards a Policy and Charging Enforcement Function (PCEF) device;
the controller being arranged for pre-authorizing the request of the bearer resource, the request received before having received the QoS authorization; and
the transmitter being arranged for installing initial control rules applicable to the pre-authorized request, wherein the initial control rules are temporary control rules valid only during a configurable time period without having received the QoS authorization, and for further updating the previously installed initial control rules with final control rules upon receipt of the QoS authorization.

14. The PCRF server of claim 13, wherein the transmitter is arranged for de-installing towards the PCEF device the initial control rules after expiry of the time period.

15. The PCRF server of claim 13, wherein the pre-authorization is valid only during the configurable time period upon which expiry, without having received the QoS authorization, the corresponding bearer resource is de-authorized at the controller.

16. The PCRF server of claim 13, wherein the transmitter is arranged for installing the initial control rules along with an indication of being temporary control rules valid only during the configurable time period.

17. The PCRF server of claim 16, wherein the receiver is arranged for receiving an indication from the PCEF device informing that the initial control rules have been de-installed after expiry of the time period, and the controller is arranged for removing the initial control rules.

18. The PCRF server of claim 13, wherein the final control rules include new control rules complementing the initial control rules, and the transmitter is arranged for indicating such complement towards the PCEF device.

19. The PCRF server of claim 13, wherein the final control rules are considered new control rules implicitly de-installing the initial control rules towards the PCEF device.

20. The PCRF server of claim 13, wherein the initial control rules are installed with a gate status set to disabled.

21. The PCRF server of claim 13, wherein the pre-authorization may be carried out by the controller upon receipt in the receiver of a pre-authorization indication from a Proxy Call Session Control Function (P-CSCF) server.

22. The PCRF server of claim 13, wherein the QoS authorization for reserving a bearer is received from a Proxy Call Session Control Function server.

23. A Policy and Charging Enforcement Function (PCEF) device for enforcing control rules on a per bearer resource basis, having a transmitter for submitting a request for the bearer resource, a receiver for receiving control rules to be installed for the bearer resource, and a controller for applying the control rules to the bearer resource, the receiver being arranged for:

receiving initial control rules applicable to the bearer resource pre-authorized by a Policy and Charging Rules Function (PCRF) server before having a Quality of Service (QoS) authorization available, wherein the initial control rules are temporary control rules valid only during a configurable time period without having received the final control rules from the PCRF server, and receiving final control rules from the PCRF server to update the initial control rules once the QoS authorization is available, and wherein the controller is arranged for updating the initial control rules with final control rules upon receipt of such updating from the PCRF server.

24. The PCEF device of claim 23, wherein the receiver is further arranged for receiving a de-installation of the initial control rules from the PCRF server and the controller is further arranged for triggering the de-installation of the initial control rules.

25. The PCEF device of claim 23, wherein the receiver is further arranged for receiving the initial control rules along with an indication of being temporary control rules valid only during the configurable time period.

26. The PCEF device of claim 25, wherein the controller is further arranged for triggering the de-installation of the initial control rules upon expiry of the time period.

27. The PCEF device of claim 26, wherein the transmitter is arranged for submitting an indication towards the PCRF server informing that the initial control rules have been de-installed after expiry of the time period.

28. The PCEF device of claim 23, wherein the final control rules include new control rules complementing the initial control rules, the receiver is arranged for receiving an indication of such complement, and the controller is further arranged for adding the new control rules to the initial control rules previously installed and for considering the addition as the final control rules.

29. The PCEF device of claim 23, wherein the final control rules are new control rules, and the controller is further arranged for triggering de-installation of the initial control rules in response to the receiver receiving the final control rules.

30. The PCEF device of claim 23, wherein the receiver is further arranged for receiving an indication, along with the initial control rules, indicating installation with a gate status set to disabled.

31. The PCEF device of claim 23, included in a Gateway GPRS Support Node (GGSN).

32. The PCEF device of claim 23, included in a Packet Data Network Gateway (PDN-GW).

* * * * *

UNITED STATES PATENT AND TRADEMARK OFFICE
CERTIFICATE OF CORRECTION

Page 1 of 1

PATENT NO. : 8,640,186 B2
APPLICATION NO. : 12/743642
DATED : January 28, 2014
INVENTOR(S) : Castellanos Zamora et al.

It is certified that error appears in the above-identified patent and that said Letters Patent is hereby corrected as shown below:

On the Title Page, item (57), under "ABSTRACT", in Column 2, Line 7, delete "has," and insert -- has --, therefor.

In the Specification:

In Column 8, Line 5, delete "Qos" and insert -- QoS --, therefor.

In Column 8, Line 53, delete "Qos" and insert -- QoS --, therefor.

In Column 10, Line 1, delete "Qos" and insert -- QoS --, therefor.

In Column 10, Line 17, delete "Qos" and insert -- QoS --, therefor.

In the Claims:

In Column 16, Line 3, in Claim 10, delete "de installed." and insert -- de-installed. --, therefor.

Signed and Sealed this
Eighth Day of July, 2014

Michelle K. Lee
*Deputy Director of the United States Patent and Trademark Office*